(12) United States Patent
Yamazaki et al.

(10) Patent No.: US 6,493,877 B1
(45) Date of Patent: Dec. 10, 2002

(54) DIGITAL DATA DISTRIBUTION SYSTEM HAVING A REDUCED END STATION MEMORY REQUIREMENT

(75) Inventors: Junichi Yamazaki, Atsugi (JP);
Takahiko Kamae, Kawasaki (JP);
Farhad Fuad Islam, Marsfield (AU)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/118,034

(22) Filed: Jul. 17, 1998

(30) Foreign Application Priority Data

Jul. 18, 1997 (JP) .............................................. 9-209913

(51) Int. Cl.[7] ................................................ H04N 7/10
(52) U.S. Cl. ......................... 725/100; 725/32; 725/137; 725/139; 348/467; 348/468
(58) Field of Search ................................. 348/461, 462, 348/463, 465, 467, 468; 7/4, 8, 87; 725/32, 137, 100, 131, 139, 151

(56) References Cited

U.S. PATENT DOCUMENTS

| 4,429,385 A | * | 1/1984 | Cichelli et al. | |
| 5,016,192 A | * | 5/1991 | Ishido et al. | 348/465 |
| 5,208,671 A | * | 5/1993 | Tarrant | 345/565 |
| 5,600,573 A | * | 2/1997 | Hendricks et al. | |
| 5,691,776 A | * | 11/1997 | Van Gestel | 725/137 |
| 5,821,982 A | * | 10/1998 | Santilli et al. | 348/467 |

OTHER PUBLICATIONS

Brodsky, Ira, " Wireless Computing: A Manager's Guide to Wireless Networking", Chapter 6, pp. 152–154, 1997.
"Television Based Data Broadcasting Products".

* cited by examiner

*Primary Examiner*—Andrew Faile
*Assistant Examiner*—Kieu-Oanh Bui

(57) ABSTRACT

A digital data distribution system that comprises a broadcasting station and an end station. The broadcasting station broadcasts a broadcast signal repetitively modulated with a digital information signal. The digital information signal includes a file group composed of body files containing any or all of audio, graphics and text information. The end system includes a receiver, a user interface, a memory, a controller and a reproduction section. The receiver receives the broadcast signal from the broadcasting station and demodulates the digital information signal from the broadcast signal to generate a digital bit stream. The user interface allows a user to select at least one of the body files for storage as a selected body file. The memory is substantially smaller than the file group. The controller identifies the selected body file in the digital bit stream and causes the selected body file to be stored in the memory. The reproduction section reproduces the audio, graphics or text information contained in the selected body file stored in the memory.

20 Claims, 6 Drawing Sheets

DIGITAL DATA DISTRIBUTION SYSTEM HAVING A REDUCED END STATION MEMORY REQUIREMENT

FIELD OF THE INVENTION

The invention relates to a digital data distribution system in which a digital information signal representing of any or all of audio information, graphics information, and text information is broadcast by a broadcast station, and in which an end station receiving the signal can select and store only the information required by the user.

BACKGROUND OF THE INVENTION

Text information transmission technology called teletext technology, in which auxiliary data are transmitted as part of the television or radio signal broadcast by a television station or a radio station is well established. As shown in FIG. 1, in this type of transmission technology, the television or radio broadcast station 8 includes the transmitter 81. The transmitter performs multiplexed transmission in which a single carrier signal is modulated with a digital information signal and a conventional analog radio signal or a conventional analog television signal. The digital information signal includes the digital text file F. The television or radio signal broadcast by the transmitter 81 is received by the end systems of an unspecified large number of users. The end systems include end systems capable of demodulating the digital text file F from the broadcast signal. An example of such an end system is shown at 9. The end system 9 includes the memory 91, the display device 92, the keyboard 93, the controller 94 to enable it to receive, demodulate and display the contents of the digital text file F.

The controller 94 controls the memory 91, display device 92, and keyboard 93.

The end system 9 receives the broadcast signal from the broadcast station 8, demodulates the broadcast signal to recover the digital text file F and displays the contents of the recovered digital text file on the display device 92.

For example, the recovered text file may include various text information, such as the news, the weather forecast, charts of hit popular songs and the like. The recovered text file also includes index information that hierarchically displays items such as the news described above. The user can operate the keyboard 93 to select a desired item from the various items displayed on the display device 92 and can then display the contents of the selected item on the display device. An example of the index is shown displayed on the display device 92.

If the user of the end system 9 only wants to see the weather forecast, for example, the news and charts of hit popular songs, etc. are irrelevant to this user. However, such irrelevant information is included in the digital text file F described above. The end system will receive information that is irrelevant to the user and must provide memory greater in size than that of the text file F in which to store the entire text file F, including the irrelevant information.

The problem with the conventional transmission technology described above is that the amount of information needed by the user may constitute a small fraction of the amount of information in the text file F that is received and must be stored by the end system. Moreover, if the digital information signal includes audio information and graphics information in addition to text information, the size of the digital information signal is significantly increased, and the number of digital information signals that can be stored in a memory of a given size in the end system 9 is reduced as a result. This is true even if any of the currently-known digital data compression techniques are applied to the audio or graphics information. More digital information signals including audio information and graphics information can be stored by increasing the amount of memory. However, the amount of memory that can be provided in the end system is limited by cost and the need for the end system to be portable. Consequently, in current teletext systems based on television broadcasting and radio broadcasting stations, the broadcast digital information signals contain only text information.

In a two-way communication system such as the Internet, the user can specify one or more specific ones of the files stored in the memory of a given host and can download only the specified files to his or her end system. The problem of information not wanted by the user being received and stored by the user's end system normally does not arise with such a system. However, a two-way communication system requires that transmission and reception facilities be provided in both the host and the end system. Large-capacity lines, and compatible modems and adapters are required at the host. In addition, a telephone line, a modem, and possibly an end system adapter are required at the end system.

The Internet usually provides links between multiple files. Such links may extend between a link originator page, such as a home page, and a link destination page, which is a page listed on the home page. The users can easily change the display from the link originator page to the link destination page using the network. However, congestion in the data connection to the host at the link destination can impose a long delay in accessing the destination page, or may even prevent access to the destination page.

What is needed is a data broadcast system that can be implemented easily both at the broadcast station and at the end system and that enables the end station to store only the information needed by the user. What is also needed is a data broadcast system in which a broadcast station can broadcast to multiple end stations either or both of audio information and graphics information in addition to, or instead of, text information.

SUMMARY OF THE INVENTION

The invention provides a digital data distribution system that comprises a broadcasting station and an end station. The broadcasting station broadcasts a broadcast signal repetitively modulated with a digital information signal. The digital information signal includes a file group composed of body files containing any or all of audio, graphics and text information. The end system includes a receiver, a user interface, a memory, a controller and a reproduction section. The receiver receives the broadcast signal from the broadcasting station and demodulates the digital information signal from the broadcast signal to generate a digital bit stream. The user interface allows a user to select at least one of the body files for storage as a selected body file. The memory is substantially smaller than the file group. The controller identifies the selected body file in the digital bit stream and causes the selected body file to be stored in the memory. The reproduction section reproduces the audio, graphics or text information contained in the selected body file stored in the memory.

One of the body files in the file group may includes an index file containing text information that briefly describes the contents of each of the remaining body files in the file group.

The broadcasting station may include a first identifier in each of the body files and the user interface may generate a second identifier corresponding to the selected body file. In this case, the controller compares the first identifiers in the digital bit stream to the second identifier and causes the selected body file to be stored when the identifiers match.

One of the body files in the file group may include an offset table file in which is stored an offset between a reference point in the file group and each of the remaining body files in the file group, and the user interface may generate an offset corresponding to the selected body file. In this case, the controller recognizes the reference point in the digital bit stream and counts the number of bits in the digital bit stream equal to the offset before causing the selected body file to be stored.

A link may extend between a first one and a second one of the body files in the file group or between a first one of the body files in a first file group and a second one of the body files in a second file group. In this case, the controller identifies the second one of the body files in the digital bit stream and causes the second one of the body files to be stored in the memory in response to the link.

The invention also provides an end station for receiving and reproducing digital data from a digital data distribution system in which a broadcast signal repetitively modulated with a digital information signal is broadcast. The digital information signal includes a file group composed of body files containing any or all of audio, graphics and text information. The end station comprises a receiver, a user interface, a memory, a controller and a reproduction section. The receiver receives the broadcast signal from the broadcasting station and demodulates the digital information signal to generate a digital bit stream. The user interface enables a user to select at least one of the body files for storage as a selected body file. The controller identifies the selected body file in the digital bit stream and causes the selected body file to be stored in the memory. The reproduction section reproduces the audio, graphics or text information contained in the selected body file stored in the memory.

Each of the body files may include a first identifier, and the user interface may generate a second identifier corresponding to the selected body file. In this case, the controller compares the first identifiers in the digital bit stream to the second identifier and causes the selected body file to be stored in the memory when the identifiers match.

One of the body files in the file group may include an offset table file in which is stored an offset between a reference point in the file group and each of the remaining body files in the file group, and the user interface may generate an offset corresponding to the selected body file. In this case, the controller recognizes the reference point in the digital bit stream and counts a number of bits in the digital bit stream equal to the offset, starting at the reference point, before causing the selected body file to be stored in the memory.

One of the body files in the file group may include an index file containing text information that briefly describes the contents of each of the remaining body files in the file group and that also briefly describes the contents of supplementary body files not included in the file group. In this case, the end station may additionally comprise a telephone that sends a supplementary body file request to the broadcast station. The supplementary body file request identifies one of the supplementary body files. In addition, the controller may operate in response to the supplementary body file request to identify the supplementary body file in the digital bit stream when the supplementary body file is later broadcast, and to cause the supplementary body file to be stored in the memory.

DETAILED DESCRIPTION OF THE INVENTION

Figure 1:
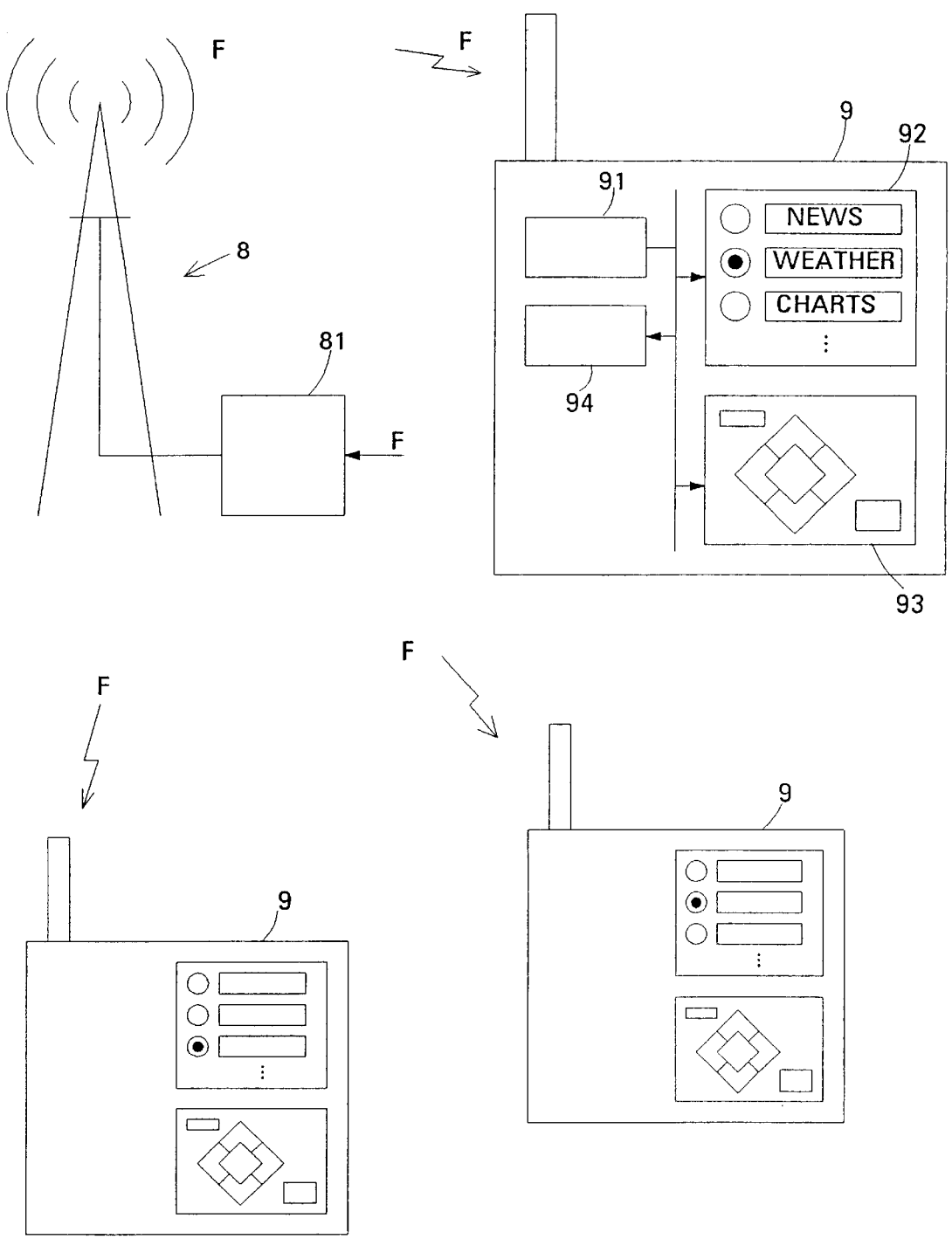
FIG. 1 is a block diagram of a conventional digital data distribution system based on a radio or television station.
Figure 2:
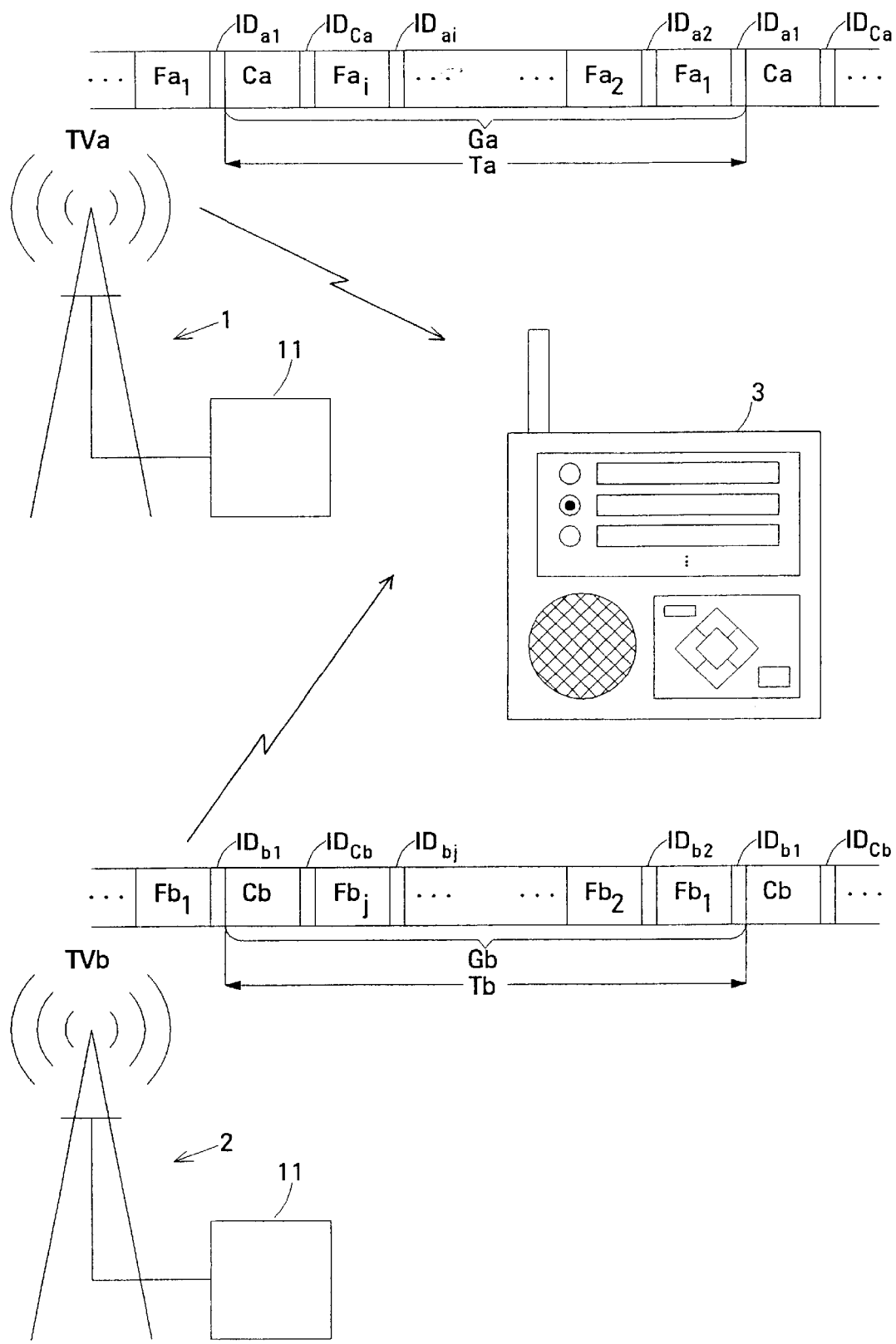
FIG. 2 shows a first embodiment of a digital data distribution system according to the invention.

FIG. 2 is a block diagram of a first embodiment of a digital data distribution system according to the invention. The system includes the broadcast stations 1, 2, each of which includes a transmitter 11. The broadcast stations may be radio stations, television stations or both radio stations and television stations. The signals broadcast by the broadcast stations are received by multiple end systems, an exemplary one of which is shown at 3. Broadcast station 1 broadcasts the broadcast signal $TV_a$ generated by modulating an RF carrier signal by a signal obtained by multiplexing a digital information signal and a conventional analog signal. The digital information signal is composed of the file group Ga that contains the i+1 body files $Fa_1, \ldots, Fa_2, \ldots, Fa_i$, and Ca. Broadcast station 2 broadcasts the broadcast signal $TV_b$ generated by modulating an RF carrier signal by a signal obtained by multiplexing a digital information signal and a conventional analog signal. The digital information signal is composed of the file group Gb that contains the j+1 body files $Fb_1, Fb_2, \ldots, Fb_j$, and Cb. In both cases, the conventional analog signal is an audio signal if the broadcast station is a radio station, and is an audio-video signal if the broadcast station is a television station.

The digital information signals are broadcast constantly. Since the file groups Ga and Gb are of finite length, the file groups are broadcast repetitively. The repetition periods for the file groups Ga and Gb are indicated by $T_a$ and $T_b$, respectively.

The body files $Fa_1, Fa_2, \ldots, Fa_i$ and $Fb_1, Fb_2, \ldots, Fb_j$ contain audio information, graphics information, or text information. The body files Ca and Cb are index tables and contain text information only. In this embodiment, the body files $Fa_1, Fa_2, \ldots, Fa_i$, Ca and $Fb_1, Fb_2, \ldots, Fb_j$ each begin with a header that includes the file identifier $ID_{a1}, ID_{a2}, \ldots, ID_{ai}, ID_{Ca}$ and $ID_{b1}, ID_{b2}, \ldots, ID_{bi}, ID_{Cb}$, respectively. The file identifier indicates the beginning of each body file in the respective file group, and additionally identifies the body file that follows the file identifier.

Figure 3:
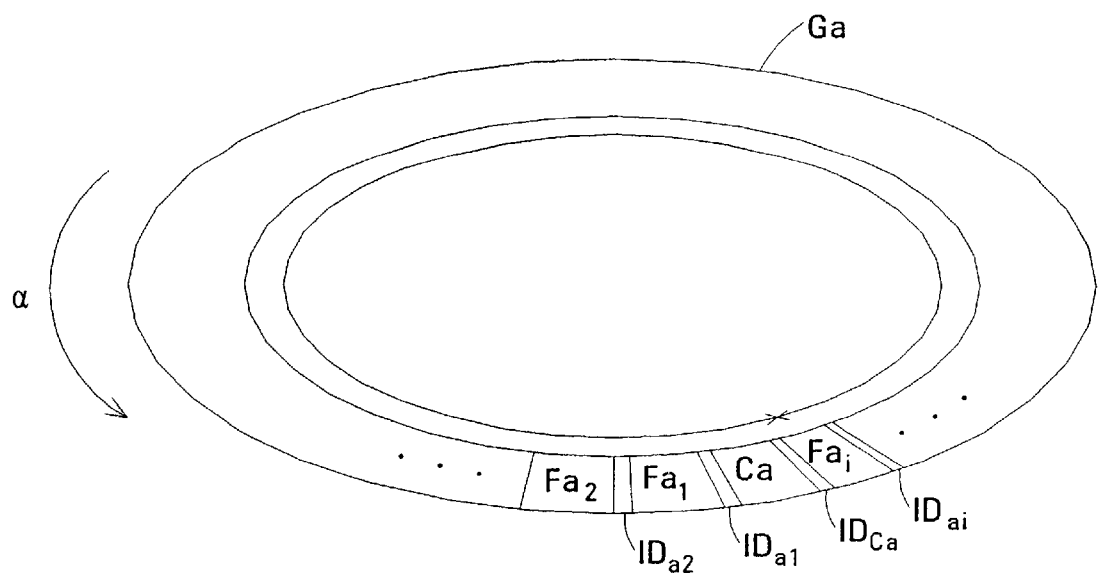
FIG. 3 shows the queuing structure of the body files forming the file group broadcast by the broadcast station shown in FIG. 2.

FIG. 3 shows the queuing structure of the body files constituting the file group Ga broadcast by broadcast station 1. The queuing structure of body files constituting the file group Gb broadcast by broadcast station 2 is the same. The queuing structure is analogous to placing the body files on a turntable that rotates in the direction of arrow α and that completes one rotation in a time $T_a$. As perceived by an observer, each body file $Fa_1, Fa_2, \ldots, Fa_1$, and Ca is repetitively broadcast with a time of $T_a$ between repetitions. This way of broadcasting is called the turntable method. With the turntable method of broadcasting the body files, if the user cannot immediately receive a selected body file broadcast by the broadcast station 1, for example, he or she must wait for no longer than a time $T_a$ to receive the file. However, if the user has not previously received the index table Ca broadcast by the broadcast station 1, he or she may additionally have to wait a time of up to $T_a$ to receive the index file before selecting one of the body files.

Figure 4:
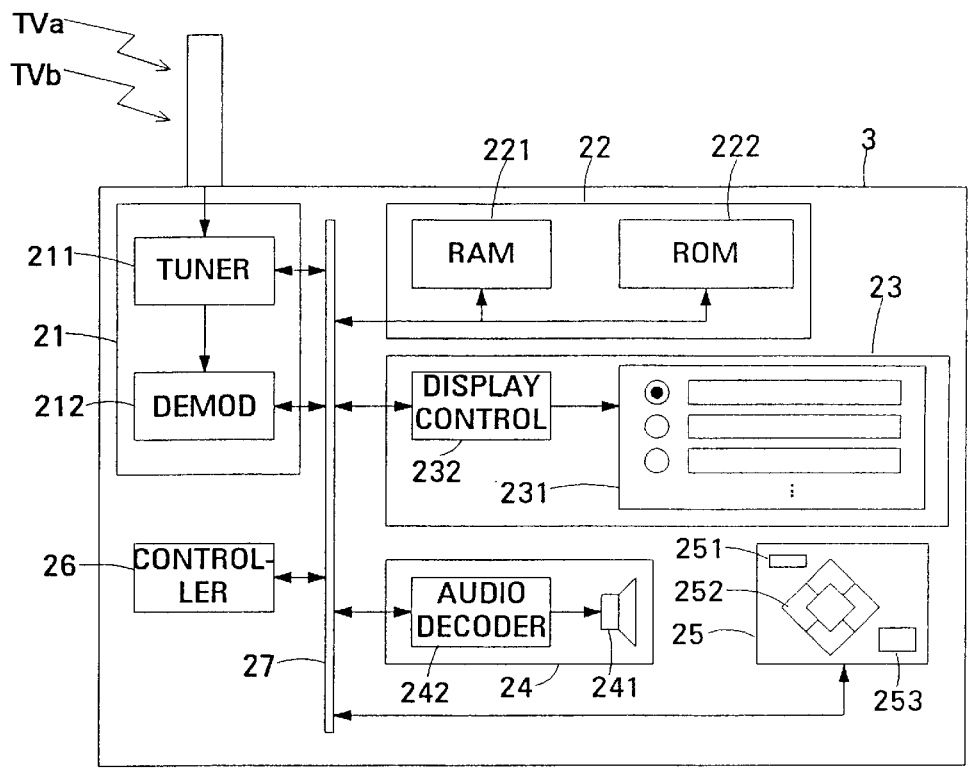
FIG. 4 is a block diagram of structure of the end system of the digital data distribution system shown in FIG. 2.

FIG. 4 shows the structure of the end system 3 of the data broadcast system shown in FIG. 2. The end system includes the receiver 21, the memory 22, the display device 23, the audio output device 24, the keyboard 25, and the controller 26. The receiver 21, memory 22, display device 23, audio output device 24, and keyboard 25 are controlled by the controller 26.

The receiver 21 includes the tuner 211 and the digital signal demodulator 212. The tuner 211 receives a broadcast signal at a frequency specified by the controller 26 and feeds an output to the digital signal demodulator 212. The digital signal demodulator 212 demodulates the digital information signal from the broadcast signal and feeds the resulting digital bit stream to the bus 27. The memory 22, display device 23, audio output device 24, and controller 267 are also connected to the bus.

The memory 22 is composed of the Random Access Memory (RAM) 221 and the Read Only Memory (ROM) 222. The RAM 221 receives the digital bit stream from the bus 27 and selectively stores portions of the digital bit stream in response to control signals from the controller 26. The RAM can additionally transfer the stored digital data to the bus 27. The operating system (OS) program of the end system 3 and other useful data are stored in the ROM 222.

The display device 23 includes the display 231 and the display controller 232. The display controller 232 operates in response to control signals from the controller 26 to generate a display signal from the graphics and text information contained in the body files received by the receiver 21. The display signal is fed to the display. The display displays the graphics and text represented by the graphics and text information in response to the display signal. Among the items that can be displayed by the display of the display device are the various menus that will be described below.

The audio output device 24 includes the loudspeaker 241 and the audio decoder 242. The audio decoder 242 operates in response to control signals from the controller 26 to generate an audio signal in response to audio information contained in the body files. The audio signal is fed to the loudspeaker. The loudspeaker generates sound in response to the audio signal.

The keyboard 25 is part of the user interface of the end system 3 and includes the power on/off switch 251, the cursor control keys 252, and enter key 253. The keyboard is located on an exposed surface, such as the front panel, of the end system 3.

An example of the operation of the end system 3 will now be described with reference to FIGS. 4 and 5A–5C. When the user operates the power on/off switch 251 to switch the end system ON, the end system operates to display on the display 231 the initial menu $M_1$ shown in FIG. 5A. In this embodiment, ROM 222 in the ends station stores the names of broadcast stations 1, 2 described above, the frequencies of broadcast signals $TV_a$, $TV_b$ broadcast by these broadcast stations, and the identifiers $ID_{Ca}$, $ID_{Cb}$ of the index tables Ca, Cb. When the power is turned ON, the controller 26 reads these data from the ROM and transfers them via the bus 27 to the display controller 232. The display controller generates a display signal that causes the display 231 to display the menu $M_1$ that includes the names of broadcast stations 1, 2, indicated in FIG. 5A by KAAA and KBBB.

Next, the user operates the cursor control keys 252 and the enter key 253 to select the broadcast station 1 from the menu $M_1$. Based on this selection, the controller 26 tunes the reception frequency of the tuner 211 to the frequency of the broadcast station 1 previously read from the ROM 221, i.e., to the frequency of the broadcast signal $TV_a$. As a result, the tuner receives the broadcast signal $TV_a$. The demodulator 212 demodulates the digital information signal from the broadcast signal and places the resulting digital bit stream on the bus 27. The digital bit stream include the identifiers $ID_{a1}, ID_{a2}, \ldots, ID_{ai}, ID_{Ca}$ located in the headers of the body files constituting the file group Ga.

In addition, in response to the user's broadcast station selection, the controller 26 transfers the identifier $ID_{Ca}$ of the index table Ca shown in FIGS. 2 and 3 via the bus 27 to a file decision register (not shown) located in the controller. The identifier was previously read from the ROM 222. The controller compares the identifiers in the digital bit stream on the bus with the identifier stored in its file decision register. A match in the identifiers identifies the body file Ca. In this embodiment, the body files are identified by the controller 26, but the body files can alternatively be identified by a separate processor dedicated to body file identification.

The end system 3 operates automatically to scan the broadcast bands assigned to broadcast stations that broadcast digital information signals to detect such broadcast stations in its reception range. In this mode, the end station detects the identities of the broadcast stations from station identification included in the digital information signals broadcast by the broadcast stations, and displays the identities of the broadcast stations on the menu $M_1$. For example, the identifier for the body file containing the index file Ca may be the same for all broadcast stations. The station identification, together with the body file identifiers for the file group broadcast by the broadcast station, can then be stored in the body file together with the index file. The end station can then extract these data from the body file containing the index file instead of reading them from the ROM 222. The display 231 can display an indication showing that the end station is operating in this mode. In addition, the user need not manually select one of the broadcast stations 1, 2 (see FIG. 2). Instead, the end system 3 can select one of the broadcast stations, for example, broadcast station 1, by default. In this case, when the power on/off switch 251 is set to ON, the controller 26 automatically transfers the above-described identifier $ID_{Ca}$ to the file decision register.

The tuner 211 receives the broadcast signal from the broadcast station 1, the demodulator 212 demodulates the digital information signal and places the resulting digital bit stream on the bus 27. As noted above, the digital bit stream includes the identifiers $ID_{a1}$, $ID_{a2}$, ..., $ID_{ai}$, $ID_{Ca}$ of the body files constituting the file group Ga. When the controller 26 matches one of the identifiers in the digital bit stream on the bus to the identifier $ID_{Ca}$ of the body file Ca stored in its file decision register described above, the controller performs an operation that stores the portion of the digital bit stream following the identifier, namely, the main portion of the index table Ca, in the RAM 221.

Irrespective of whether or not an identifier identified on the bus 27 is the idenfier $ID_{Ca}$ of the index table Ca, at least part of the main portion of the body file following the identifier can be stored in a specific portion of the RAM 221. In this case, when the identifier on the bus 27 does not match the identifier $ID_{Ca}$, the main portion of the body file following the identifier overwrites the main portion of the body file following the previously-received identifier that is already stored in the RAM. The means that the process of storing the body file in the RAM does not have to be delayed until the identifier of the body file has been compared with the identifier stored in the file decision register. Then, when the identifier on the bus 27 is eventually determined to match the identifier $ID_{Ca}$ of the index table Ca stored in the file decision register the overwriting process is stopped so that the index table Ca remains stored in the RAM.

Figure 5A:
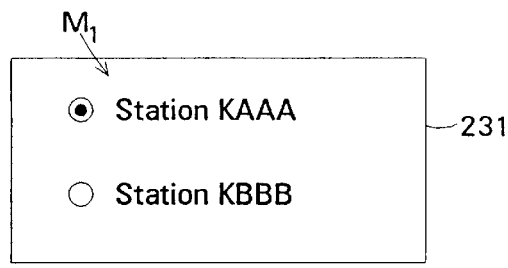
FIG. 5A shows how the names of the two broadcast stations shown in FIG. 2 are displayed on a menu.
Figure 5B:
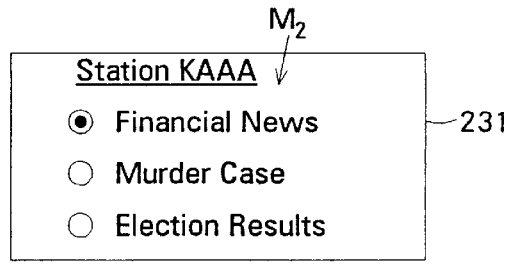
FIG. 5B shows how the contents of the index table broadcast by one of the broadcast stations are displayed on a menu.
Figure 5C:
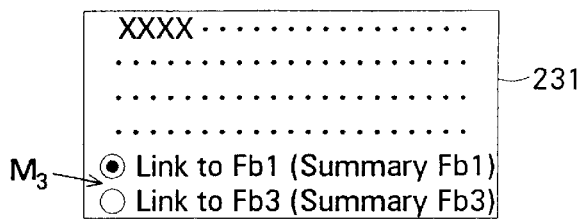
FIG. 5C shows how the screen displaying the contents of a body file can additionally include a menu of link destinations.

The index table Ca is stored in a specific area of the RAM 221. The index file contains an index of the body files $Fa_1$, $Fa_2$, ..., $Fa_i$ described above with reference to FIGS. 2 and 3 and of the identifiers $ID_{a1}$, $ID_{a2}$, ..., $ID_{ai}$ of the body files $Fa_1$, $Fa_2$, ..., $Fa_i$. The controller 26 causes the display device 23 to display the contents of the index table Ca as a table showing the body files $Fa_1$, $Fa_2$, ..., $Fa_i$. FIG. 5B shows a simplified example of how the display device displays the menu $M_2$ in response to the contents of the index table Ca. The menu $M_2$ includes a list of the contents of the body files in the file group Ga. In this simplified example, the file group includes only three body files.

The user can reference the index displayed on the display 231 and can operate the keyboard 25 to select any one or more of the above body files $Fa_1$, $Fa_2$, ..., $Fa_i$. Although some of the body files $Fa_1$, $Fa_2$, ..., $Fa_i$ broadcast by the broadcast station 1 can be linked to other body files, the body files are not linked in this example.

If, for example, the body file $Fa_2$ shown in FIGS. 2 and 3 are selected by the user, the end system 3 operates in a similar way to the way in which it operated to receive the index table Ca to store the body file $Fa_2$ in a specific region of the RAM 221. The controller 26 sets the identifier $ID_{a2}$ of body file $Fa_2$ in its file decision register. The tuner 211 receives the broadcast signal $TV_a$, the demodulator demodulates the digital information signal and places the resulting digital bit stream on the bus 27. As noted above, the digital bit stream includes the identifiers $ID_{a1}$, $ID_{a2}$, ..., $ID_{ai}$, $ID_{Ca}$ of the body files constituting the file group Ga. When the controller 26 matches one of the identifiers on the bus to the identifier $ID_{a2}$ of the body file $Fa_2$ stored in its file decision register described above, the controller causes the portion of the digital bit stream following the identifier, namely, the main portion of the body file $Fa_2$, to be stored in a specific portion of the RAM 221.

The display 231 then displays the graphics information and text information contained in the body file $Fa_2$ stored in the RAM 221. The loudspeaker 241 reproduces the audio information contained in the body file $Fa_2$.

By tuning the receiver 21 to the frequency of broadcast station 2, the display 231 can also display the index table Cb broadcast by broadcast station 2 shown in FIGS. 2 and 3 in a manner similar to that described above. The display can also display and the loudspeaker 241 can reproduce the information included in the body files $Fb_1$, $Fb_2$, ..., $Fb_j$ shown in FIGS. 2 and 3 in a manner similar to that described above.

A link can extend between a specific one of the body files $Fa_1$, $Fa_2$, ..., $Fa_i$, Ca described above and another of the body files $Fa_1$, $Fa_2$, ..., $Fa_i$, Ca. Additionally or alternatively, a link can extend between a specific one of the body files $Fa_1$, $Fa_2$, ..., $Fa_i$, Ca and a specific one of the body files $Fb_1$, $Fb_2$, ..., $Fb_j$, Cb described above.

For example, a bidirectional link can extend between the body file $Fa_2$ broadcast by the broadcast station 1 and the body files $Fb_1$ and $Fb_3$ broadcast by broadcast station 2. Link information indicating the link destination can be included in the body file of the link origin and can also be included in an index table. For example, the link information of the body file of the link destination is written in the index table Ca. The link information may include, for example, the broadcast station frequency and the identifier of the body file at the link destination. When the contents of the body file $Fa_2$ are displayed on the display 231, the display may additionally display the menu $M_3$ shown in FIG. 5C that includes a summary of the contents of the body files $Fb_1$, $Fb_3$ of the link destination.

When the user wants to receive the body file $Fb_1$ at the link destination of the body file $Fa_2$, he or she operates the keyboard 25 to select the link destination $Fb_1$ shown in menu $M_3$. In response to this selection, the controller 26 tunes the reception frequency of the tuner 211 to the frequency of the broadcast signal $TV_b$. The display 231 then displays the graphics information and text information contained in the body file $Fb_1$ broadcast by broadcast station 2 in a manner similar to that described above used to display the information included in the body file $Fa_2$ broadcast by broadcast station 1. Moreover, the loudspeaker 241 reproduces the audio information contained in the body file $Fb_1$.

Figure 6:
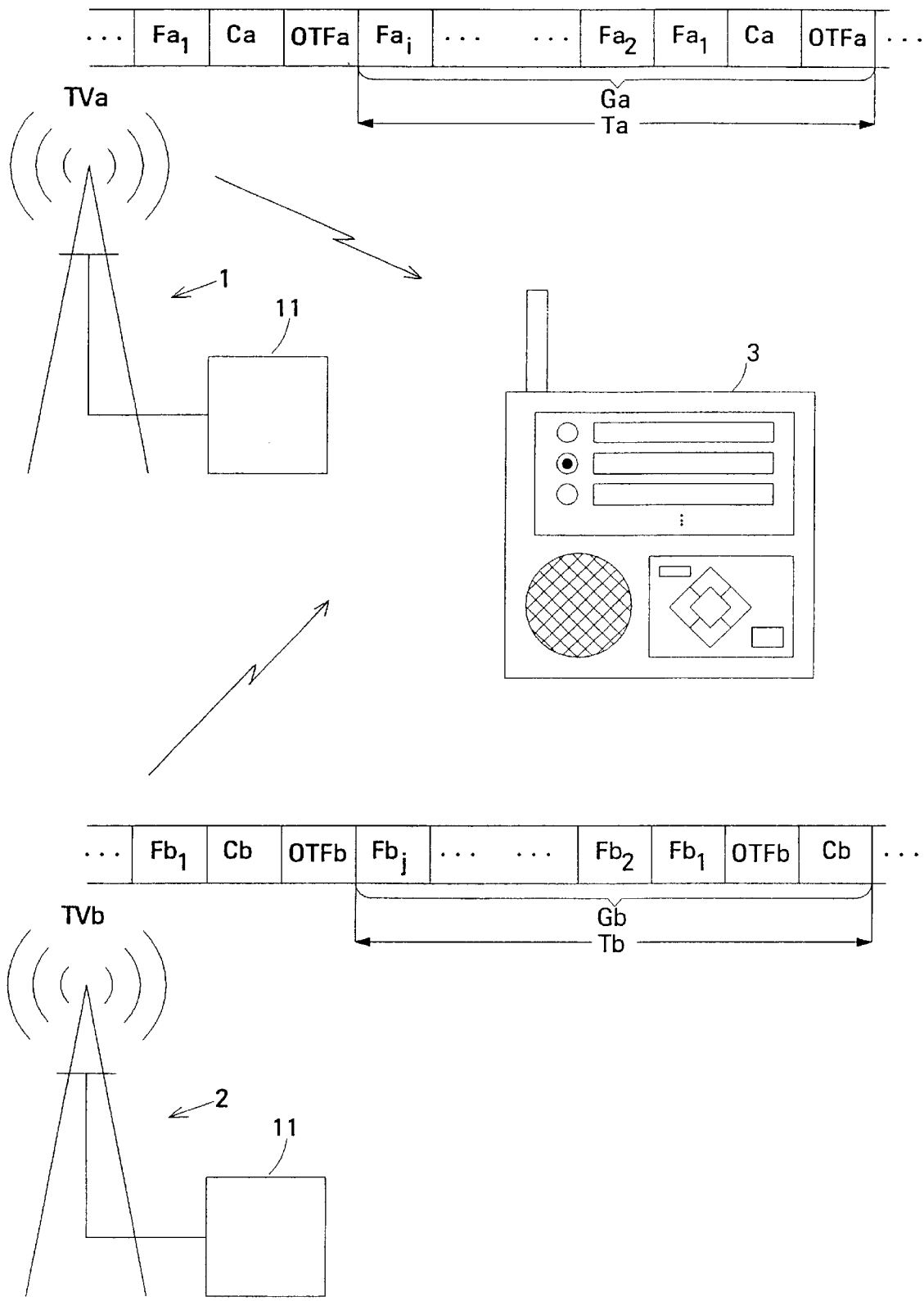
FIG. 6 shows a second embodiment of a digital data distribution system according to the invention.

FIG. 6 is a block diagram showing a second embodiment of a digital broadcast system according to the invention. Elements of the embodiment shown in FIG. 6 that correspond to elements of the embodiment shown in FIG. 2 are indicated by the same reference numerals and will not be described again.

In the embodiment shown in FIG. 6, the structure of the file groups Ga, Gb differs from that of the embodiment in FIG. 2. The body files $Fa_1$, $Fa_2$, ..., $Fa_i$, Ca, $Fb_1$, $Fb_2$, ..., $Fb_j$, Cb themselves are identical to those of the embodiment shown in FIG. 2, but their headers lack identifiers. Instead, the position of the beginning of each body file in the file groups Ga, Gb is specified, and the file groups Ga, Gb include the offset table files OTFa, OTFb, respectively. The offset table files OTFa and OTFb are placed in convenient locations in the file groups Ga, Gb.

Figure 7:
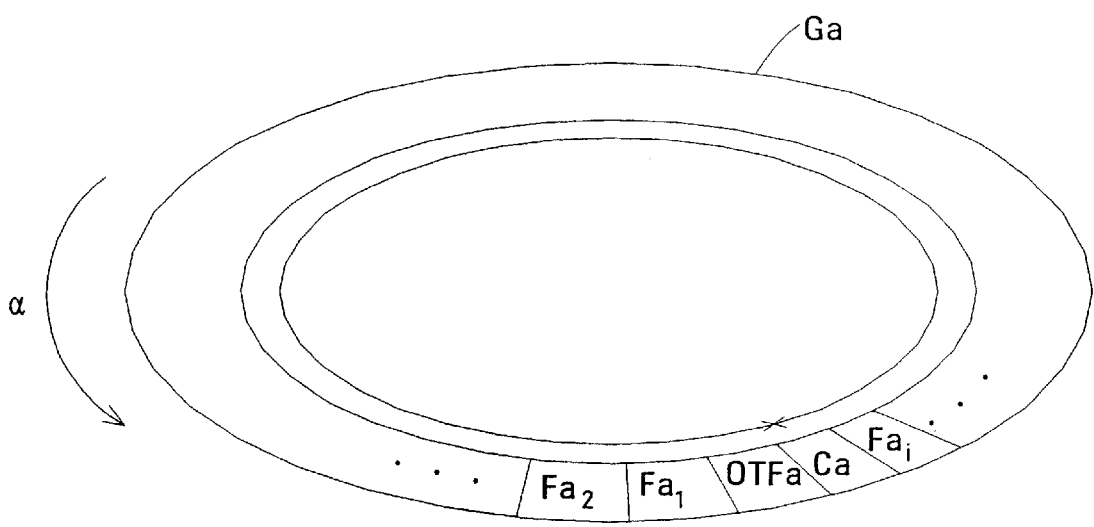
FIG. 7 shows the queuing structure of the body files forming the file group broadcast by the broadcast station shown in FIG. 6.

FIG. 7 shows the queuing structure of the body files and the offset table file OTFa constituting the file group Ga. The queuing structure of the body files constituting the file group Gb broadcast by broadcast station 2 is similar.

The body files $Fa_1$, $Fa_2$, ..., $Fa_i$, Ca and the offset table file OTFa shown in FIG. 7 use the turntable method and are broadcast with a repetition period of $T_a$. As with the queuing structure shown in FIG. 3, if the user cannot immediately receive a selected body file with the queuing structure of the file group Ga shown in FIG. 7, he or she must wait for no longer than a time $T_a$ before receiving it. However, if the user has not previously received the offset table file OTFa broadcast by the broadcast station 1 or 2, respectively, he or she may have to wait a time of up to $T_a$ to receive the offset table file, and an additional time of up to $T_a$ to receive the index file before selecting one of the body files. The total waiting time for the index file can be reduced by to a maximum of $T_a$ by eliminating the separate offset table file and integrating the offset table file into the index file, or by using a separate offset table file and locating the index file immediately after the offset table file.

In the embodiment shown in FIG. 6, the end system 3 initially operates to receive the offset table file OFTa and the index file Ca. Then, after the user has selected one of the body files, the offset of the selected body file is read from the offset table file. The offset is a value indicating the number of bits between a reference position in the file group Ga and the beginning of the target file. The reference point may be, for example, a code at the head of the offset table file OFTa. After detecting the reference point in the digital bit stream on the bus 27, the controller 26 in the end system 3 counts the number of bits indicated by the offset of the selected body file before causing the digital bit stream to be stored in the RAM 221 as the selected body file.

As in the first embodiment, a link can extend between a specific one of the body files $Fa_1, Fa_2, \ldots, Fa_i$, Ca broadcast by broadcast station 1 and another of the body files broadcast by broadcast station 1 or a specific one of the body files $Fb_1, Fb_2, \ldots, Fb_j$, Cb broadcast by broadcast station 2. In this embodiment, the link information indicating the link destination can include the frequency of broadcast station that broadcasts the body file indicated by the link destination and the offset of the body file indicated by the link destination. Moreover, links can extend between the body files of the queuing structure shown in FIG. 3 and those of the queuing structure shown in FIG. 7.

In one specific example of the invention, the body files $Fa_1, Fa_2, \ldots, Fa_i$, and body files $Fb_1, Fb_2, \ldots, Fb_j$ include the music information of popular songs. In this case, the audio information in each body file may be MIDI data or compressed audio data. The body files may additionally include graphical information defining still images or moving images, for example. The body files may additionally include text information indicating the song title, composer, and the lyrics of the songs. In this situation, for popular songs by the same singer, for example, a bidirectional link may extend between a body file broadcast by broadcast station 1 and a body file broadcast by broadcast station 2.

In a practical example, the bit rate of the digital information signal modulated on the broadcast signal $TV_a$ is 512 kbits/sec, the average size of each body file $Fa_x$ (x=1, 2, ..., 20) is 128 kbits, and the size of the index table Ca is 50 kbits, In this case, the repetition time $T_a$ is about 5 seconds. One second of audio data can be compressed to as few as 2400 bits. If 100 kbits of the 128 kbits are allocated to the audio information, about 40 seconds of audio can be included in each body file.

In another example, the body files $Fa_1, Fa_2, \ldots, Fa_i$ and the body files $Fb_1, Fb_2, \ldots, Fb_j$ contain text information representing the news. For example, the body files $Fa_1, Fa_2, \ldots, Fa_i$ can be body files containing text information representing news of different types, such as international news, economic news, current events, society, sports, etc., in multiple languages such as English, French, German, Japanese, Chinese, Korean, Arabic, etc. In this case, the contents of a news article may differ due to the language or may differ due to the type and number of genres.

The body files $Fb_1, Fb_2, \ldots, Fb_j$ can contain text information representing detailed stories related to the topics of the news articles represented by the text information contained in the body files $Fa_1, Fa_2, \ldots, Fa_i$. In this case, links extend between the body files containing the detailed stories and the body files $Fa_1, Fa_2, \ldots, Fa_i$ containing an article related to the same topic.

In the embodiments shown in FIGS. 2 and 6, the index tables Ca, Cb are contained in the body files broadcast by broadcast stations 1, 2, respectively. In a system with short repetition times $T_a$, $T_b$ of the order of 10 seconds, for example, the broadcast stations 1, 2 need not broadcast index tables Ca, Cb. Instead, the end system 3 can create such index tables. In this case, for example, the body files $Fa_1, Fa_1, \ldots, Fa_i$ each include a description section that contains a brief description of the contents of the body file. The controller 26 can sequentially identify the body files $Fa_1, Fa_2, \ldots, Fa_i$, read the contents of the description section of the body file to generate an index, and display the index on the display 231.

In the embodiments in FIGS. 2 and 6, the file groups Ga, Gb were broadcast from different broadcast stations 1, 2. However, the file groups Ga, Gb described above can be broadcast by the same broadcast station on different broadcast channels.

In the digital data distribution system according to the invention, the RAM 221 in the end station 3 is substantially smaller in size than the file groups Ga, Gb broadcast by broadcast stations 1, 2. Such a size of RAM is incapable of storing an entire file group. Instead, only the body files selected by the user are stored. The enables the size of the RAM incorporated in the end system 3 to be significantly reduced compared to a conventional system that has to store all of the body files broadcast by the broadcast stations 1, 2. Furthermore, when the body files broadcast by broadcast stations 1, 2 contain only text information, the size of the RAM 221 can be further reduced.

The digital data distribution system according to the invention enables a large quantity of information to be provided to the user without the need for a communication link between the end system 3 of each user and the broadcast stations 1, 2. No telephone lines or modems are required. Moreover, since each body file is multiplexed on a broadcast signal, the user's successful acquisition of the body file cannot be thwarted by busy communication lines.

Figure 8:
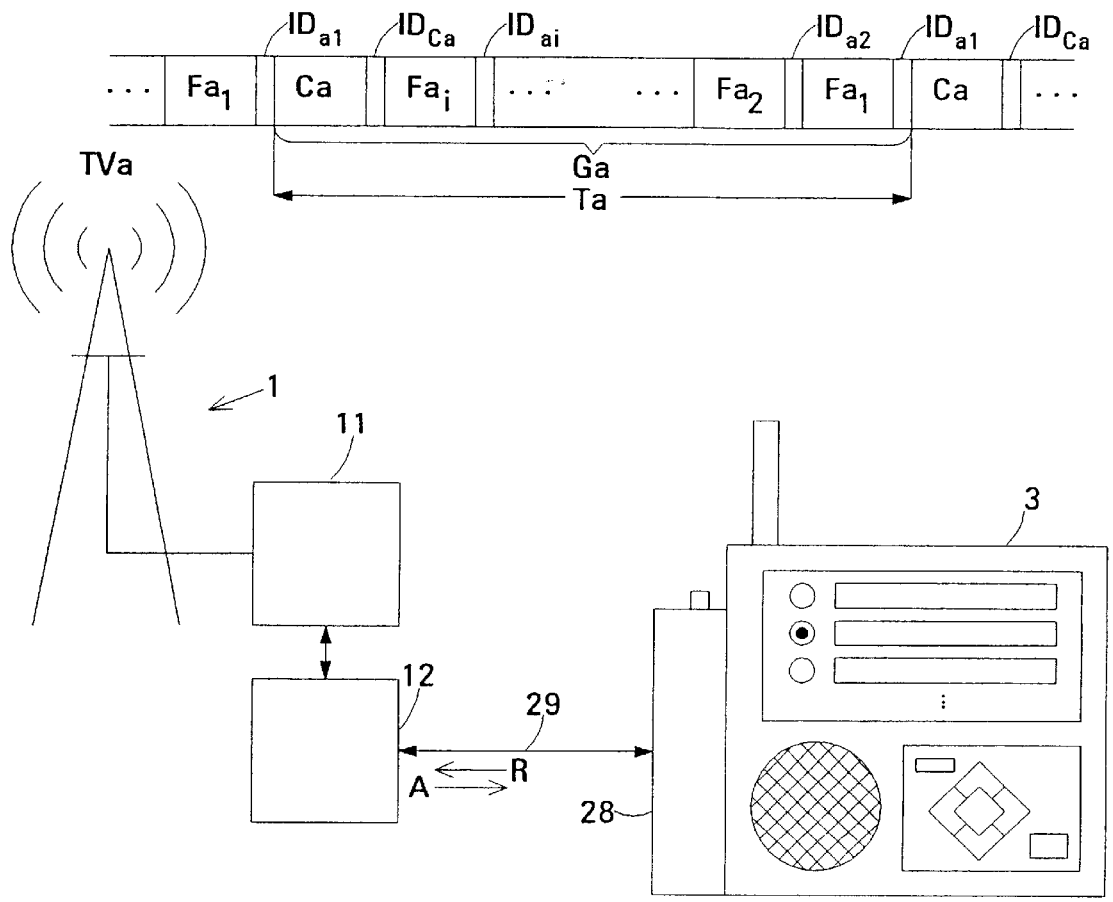
FIG. 8 shows a third embodiment of a digital data distribution system according to the invention in which the end system includes a telephone.

The digital data distribution system according to the invention can additionally use a supplementary communication device, such as a telephone, to communicate between the user and the broadcast stations. FIG. 8 shows a third embodiment of the invention in which the end system 3 of the digital data distribution system according to the invention includes the telephone 28 connected to the telephone network 29. In this embodiment, the index table Ca includes data indicating the contents of the supplementary body files $Fa_{i+1}, Fa_{i+2}, \ldots, Fa_r$ in addition to the body files $Fa_1, Fa_2, \ldots, Fa_i$. The supplementary body files are not normally included in the file group Ga. In this embodiment, headers at the beginning of the body files include the indicators $ID_{a1}, ID_{a2}, \ldots, ID_r$ and $ID_{Ca}$.

The body file selection function of the end system 3 is additionally capable of selecting the supplementary body files $Fa_{i+1}, Fa_{i+2}, \ldots, Fa_r$ described above. After reading the index table Ca, the end system displays the contents of the supplementary body files or displays a selection menu for the supplementary body files on the display. Moreover, the display displays the connection status of the telephone 28.

The telephone may be connected to the telephone network by a telephone line or a wireless connection.

In broadcast station 1, the dedicated host system 12 is connected to the telephone network 29. In response to the supplementary body file request R received from the user via the telephone 28 and the telephone network, the host system 12 instructs the transmitter 11 to broadcast the requested supplementary body file during at least one repetition period Ta of the file group Ga.

When the user operates the keyboard 25 to select the supplementary body file $Fa_{i+1}$, for example, from the selection menu, the end system 3 calls the host system 12 using the telephone 28 and the telephone network 29, and the end system 3 connects to the host system 12 through the telephone network. The host system 12 determines from the supplementary body file request R received from the end system 3 that the user has requested the body file $Fa_{i+1}$.

After a specific time has elapsed, the host system 12 transmits the advance warning signal A through the telephone network 29 to the end system 3 and causes the transmitter 11 to insert the body file $Fa_{i+1}$ temporarily into the file group Ga and thereby broadcast the body file $Fa_{i+1}$.

When the end system 3 receives the advance warning signal A indicating that the supplementary body file $Fa_{i+1}$ is to be broadcast, the end system stores the identifier $ID_{a(i+1)}$ of the body file $Fa_{i+1}$ in the file decision register. The transmitter 11 broadcasts the body file $Fa_{i+1}$ a specific delay time after the transmission of the advance warning signal A. The delay time is equal to a specific multiple of the repetition period $T_a$. The end system 3 can disconnect the telephone connection after the advance warning signal A has been received or can disconnect after receiving the body file $Fa_{i+1}$.

In the digital data distribution system according to the invention, since the body files are broadcast using the turntable method and since the body files are individually identified in the file group, only the information required by the user among the audio information, graphics information, and text information broadcast by the broadcast station is received and stored by the end system prior to being reproduced. This enables the size of the body files to be increased so that they can accommodate graphics and audio information in addition to text information without increasing the amount of memory that must be provided in the end station. In addition, the facilities in the broadcast station and in the end system can easily be constructed.

Although the invention has been described with reference to an example in which the digital information signal is broadcast to the end station by a wireless connection, this is not critical to the invention. The invention is equally applicable to a system in which the digital information signal is broadcast thorough a wired connection such as a cable television system or a network.

Although the invention has been described with reference to an example in which the digital information signal is broadcast to the end station by terrestrial transmitters, this is not critical to the invention. The invention is equally applicable to a system in which the digital information signal is broadcast by non-terrestrial transmitters such as satellites.

Although the invention has been described with reference to an example in which the digital information signal is broadcast to the end station by broadcast stations that additionally broadcast radio or televison signals, this is not critical to the invention. The invention is equally applicable to a system in which the digital information signal is broadcast by broadcast stations broadcast other types of signals or that exclusively broadcast digital information signals.

Although this disclosure describes illustrative embodiments of the invention in detail, it is to be understood that the invention is not limited to the precise embodiments described, and that various modifications may be practiced within the scope of the invention defined by the appended claims.

We claim:

1. A digital data distribution system, comprising:
    a broadcasting station for broadcasting a broadcast signal repetitively modulated with a digital information signal, the digital information signal including a file group including body files having at least one of audio, graphics and text information, one of the body files in the file group including an index file having text information for briefly describing the contents of each of the remaining body files in the file group; and
    an end system including:
        a receiver for receiving the broadcast signal from the broadcasting station and demodulating the digital information signal from the broadcast signal to generate a digital bit stream,
        a user interface for enabling a user to select at least one of the body files for storage as a selected body file,
        a memory having a data capacity substantially smaller than the amount of data in the file group,
        a controller for identifying the selected body file in the digital bit stream and causing the selected body file to be stored in the memory; and
        a reproduction section for reproducing the at least one of the audio, graphics and text information included in the selected body file stored in the memory.

2. The digital data distribution system of claim 1 in which:
    the broadcasting station includes means for including a first identifier in each of the body files;
    the user interface is arranged for generating a second identifier corresponding to the selected body file; and
    the controller is arranged for comparing the first identifiers in the digital bit stream to the second identifier and causing the selected body file to be stored in response to the identifiers matching.

3. The digital data distribution system of claim 1, in which:
    one of the body files in the file group includes an offset table file in which is stored an offset between a reference point in the file group and each of the remaining body files in the file group;
    the user interface generates an offset corresponding to the selected body file; and
    the controller recognizes the reference point in the digital bit stream and counts a number of bits in the digital bit stream equal to the offset, starting at the reference point, before causing the selected body file to be stored.

4. The digital data distribution system of claim 1, further including:
    a link extending between a first one and a second one of the body files in the file group; wherein:
        the controller is arranged for (a) identifying the second one of the body files in the digital bit stream and (b) causing (i) the second one of the body files to be stored in the memory in response to the link, and (ii) independent reproduction by said reproduction section of either said first or second one of the body files without the presence of the other one of the body file at the end system.

5. The digital data distribution system of claim 1 in which:
    the digital information signal is a first digital information signal;

the body files are first body files and constitute a first file group;

a link extends between any one of the first body files constituting the first file group and any one of the second body files constituting the second file group;

the receiver is arranged to operate in response to the link to receive the first and second broadcast signals and to demodulate the first and second digital information signals to generate the digital bit stream; and the controller is arranged to operate in response to the link to identify the one of the second body files in the digital bit stream and to cause the one of the second body files to be stored in the memory.

6. The digital data distribution system of claim 1, in which:

one of the body files in the file group includes an index file containing text information for briefly describing the contents of each of the remaining body files in the file group and the contents of supplementary body files not included in the file group;

the end station additionally comprises a telephone for sending a supplementary body file request to the broadcast station, the supplementary body file request being arranged for identifying one of the supplementary body files; and the broadcast station includes means, arranged to be responsive to the supplementary body file request, for temporarily adding the one of the supplementary body files to the file group.

7. The digital data distribution system of claim 1, in which the broadcast signal additionally includes one of a radio signal and a television signal.

8. A digital data distribution system, comprising:

a broadcasting station for broadcasting a broadcast signal repetitively modulated with a digital information signal, the digital information signal including a file group including body files having at least one of audio, graphics and text information; and an end system including:
  a receiver for receiving the broadcast signal from the broadcasting station and demodulating the digital information signal from the broadcast signal to generate a digital bit stream,
  a user interface for enabling a user to select at least one of the body files for storage as a selected body file,
  a memory having a data capacity substantially smaller than the amount of data in the file group,
  a controller for identifying the selected body file in the digital bit stream and causing the selected body file to be stored in the memory, the controller being arranged for causing each of the body files in the digital bit stream to be temporarily stored in the memory and overwriting a body file previously stored in the memory unless a first identifier of the body file previously stored matches the second identifier; and
  a reproduction section for reproducing the at least one of the audio, graphics and text information contained in the selected body file stored in the memory.

9. A digital data distribution system, comprising:

a broadcasting station for broadcasting a broadcast signal repetitively modulated with a digital information signal, the digital information signal including a file group including body files having at least one of audio, graphics and text information, one of the body files in the file group including an offset table file in which is stored an offset between a reference point in the file group and each of the remaining body files in the file group; and an end system including:
  a receiver for receiving the broadcast signal from the broadcasting station and demodulating the digital information signal from the broadcast signal to generate a digital bit stream,
  a user interface for enabling a user to select at least one of the body files for storage as a selected body file,
  a memory having a data capacity substantially smaller than the amount of data in the file group,
  a controller for identifying the selected body file in the digital bit stream and causing the selected body file to be stored in the memory,
  the user interface being arranged for generating an offset corresponding to the selected body file; and
  the controller being arranged for recognizing the reference point in the digital bit stream and counting a number of bits in the digital bit stream equal to the offset, starting at the reference point, before causing the selected body file to be stored; and
  a reproduction section for reproducing the at least one of the audio, graphics and text information contained in the selected body file stored in the memory.

10. A digital data distribution system, comprising:

a broadcasting station for broadcasting a broadcast signal repetitively modulated with a digital information signal, the digital information signal including a file group including body files having at least one of audio, graphics and text information, a link extending between a first one and a second one of the body files in the file group, and an end system including:
  a receiver for receiving the broadcast signal from the broadcasting station and demodulating the digital information signal from the broadcast signal to generate a digital bit stream,
  a user interface for enabling a user to select at least one of the body files for storage as a selected body file,
  a memory having a data capacity substantially smaller than the amount of data in the file group,
  a controller for identifying the selected body file in the digital bit stream and causing the selected body file to be stored in the memory;
  the controller being arranged for (a) identifying the second one of the body files in the digital bit stream and (b) causing (i) the second one of the body files to be stored in the memory in response to the link, and (ii) independent reproduction by said reproduction section of either said first or second one of the body files without the presence of the other one of the body file at the end system.

11. The digital data distribution system of claim 10, in which the link is stored in one of (a) the first one of the body files and (b) an index table contained on one of the body files constituting the file group.

12. A digital data distribution system, comprising:

a broadcasting arrangement for broadcasting first and second broadcast signals respectively repetitively modulated with first and second digital information signals, the first and second digital information signals respectively including first and second file groups respectively including first and second body files each having at least one of audio, graphics and text information, the digital information signal being a first digital information signal;

a link extending between any one of the first body files forming the first file group and any one of the second body files forming the second file group; and an end system including:
- a receiver for receiving the broadcast signals from the broadcasting arrangement and demodulating the digital information signals from the broadcast signals to generate a digital bit stream, the receiver being arranged to be responsive to the link to receive the first and second broadcast signals and to demodulate the first and second digital information signals to generate the digital bit stream; and
- a user interface for enabling a user to select at least one of the body files for storage as a selected body file,
- a memory having a data capacity substantially smaller than the amount of data in the file group,
- a controller for identifying the selected body file in the digital bit stream and causing the selected body file to be stored in the memory;
- the controller being arranged to be responsive to the link to identify the one of the second body files in the digital bit stream and to cause the one of the second body files to be stored in the memory; and
- a reproduction section for reproducing the at least one of the audio, graphics and text information contained in the selected body file stored in the memory.

13. The digital data distribution system of claim 12, wherein the broadcast arrangement includes first and second broadcasting stations for respectively broadcasting the first and second broadcast signals.

14. The digital data distribution system of claim 12, in which the link is stored in one of (a) the one of the first body files and (b) an index table contained on one of the first body files for forming the first file group.

15. A digital data distribution system, comprising:
- a broadcasting station for broadcasting a broadcast signal repetitively modulated with a digital information signal, the digital information signal including a file group including body files having at least one of audio, graphics and text information
- one of the body files in the file group including an index file containing text information for briefly describing the contents of each of the remaining body files in the file group and the contents of supplementary body files not included in the file group;
- the end station additionally comprising the broadcast station and being arranged to be responsive to the supplementary body file request, for temporarily adding the one of the supplementary body files to the file group
- an end system including:
  - a receiver for receiving the broadcast signal from the broadcasting station and demodulating the digital information signal from the broadcast signal to generate a digital bit stream,
  - a user interface for enabling a user to select at least one of the body files for storage as a selected body file,
  - a memory having a data capacity substantially smaller than the amount of data in the file group,
  - a controller for identifying the selected body file in the digital bit stream and causing the selected body file to be stored in the memory;
  - a telephone for sending a supplementary body file request to the broadcast station, the supplementary body file request being arranged for identifying one of the supplementary body files; and
  - a reproduction section for reproducing the at least one of the audio, graphics and text information contained in the selected body file stored in the memory.

16. An end station for receiving and reproducing digital data from a digital data distribution system in which a broadcast signal repetitively modulated with a digital information signal is broadcast, the digital information signal including a file group including body files having at least one of audio, graphics and text information, the end station comprising:
- a receiver for receiving the broadcast signal from the broadcasting station and demodulating the digital information signal to generate a digital bit stream;
- a user interface for enabling a user to select at least one of the body files for storage as a selected body file;
- a memory;
- a controller for identifying the selected body file in the digital bit stream and causing the selected body file to be stored in the memory causing the body files in the digital bit stream to be temporarily stored in the memory and overwriting the body file previously stored in the memory unless the first identifier of the body file previously stored matches the second identifier; and
- a reproduction section for reproducing the at least one of the audio, graphics and text information contained in the selected body file stored in the memory.

17. An end station for receiving and reproducing digital data from a digital data distribution system in which a broadcast signal repetitively modulated with a digital information signal is broadcast, the digital information signal including a file group including body files having at least one of audio, graphics and text information, a link extending between a first one and a second one of the body files in the file group;

the end station comprising:
- a receiver for receiving the broadcast signal from the broadcasting station and demodulating the digital information signal to generate a digital bit stream;
- a user interface for enabling a user to select at least one of the body files for storage as a selected body file;
- a memory;
- a controller arranged to be responsive to the link for identifying the first and second body files in the digital bit stream and causing the first and second body files to be stored in the memory; and
- a reproduction section for reproducing the at least one of the audio, graphics and text information contained in the selected body file stored in the memory, the controller being arranged for causing independent reproduction by said reproduction section of either said first or second one of the body files without the presence of the other one of the body file at the end system.

18. An end station for receiving and reproducing digital data from a digital data distribution system in which a broadcast signal repetitively modulated with a first digital information signal is broadcast, the first digital information signal including a file group including first body files in a first file group, the first body files including at least one of audio, graphics and text information, the end station also being adapted to receive digital data broadcast in a second broadcast signal repetitively modulated with a second digital information signal including a second file group including second body files, a link extending between any one of the first body files in the first file group and any one of the second body files in the second file group, the end station comprising:

a receiver for receiving the first broadcast signal from the first broadcasting station and demodulating the first digital information signal to generate a digital bit stream, the receiver being arranged to be responsive to the link for receiving the second broadcast signal and for demodulating the second digital information signal to generate the digital bit stream;

a user interface for enabling a user to select at least one of the body files for storage as a selected body file;

a memory;

a controller for identifying the selected body file in the digital bit stream and causing the selected body file to be stored in the memory, the controller being arranged to be responsive to the link for identifying the one of the second body files in the second digital bit stream and for causing the one of the second body files to be stored in the memory; and a reproduction section for reproducing the at least one of the audio, graphics and text information contained in the selected body file stored in the memory.

19. An end station for receiving and reproducing digital data from a digital data distribution system in which a broadcast signal repetitively modulated with a first digital information signal is broadcast, the first digital information signal including a file group including first body files in a first file group, the first body files including at least one of audio, graphics and text information, one of the body files in the file group including an index file containing text information that briefly describes the contents of each of the remaining body files in the file group and that also briefly describes the contents of supplementary body files not included in the file group;

a receiver for receiving the broadcast signal from the broadcasting station and demodulating the digital information signal to generate a digital bit stream;

a user interface for enabling a user to select at least one of the body files for storage as a selected body file;

a memory;

a telephone for sending a supplementary body file request to the broadcast station, the supplementary body file request identifying one of the supplementary body files;

a controller for identifying the selected body file in the digital bit stream and causing the selected body file to be stored in the memory, the controller being arranged to respond to the supplementary body file request for identifying the supplementary body file in the digital bit stream in response to the supplementary body file being a later broadcast, and for causing the supplementary body file to be stored in the memory; and a reproduction section for reproducing the at least one of the audio, graphics and text information contained in the selected body file stored in the memory.

20. The end station of claim 19, in which:

the telephone is arranged for additionally receiving an advance warning signal indicating imminent broadcast of the supplementary body file; and the controller is arranged for identifying the supplementary body file in the digital bit stream in response to the advance warning signal.

* * * * *